US009453677B2

United States Patent
Gasser

(10) Patent No.: US 9,453,677 B2
(45) Date of Patent: Sep. 27, 2016

(54) METHOD AND DEVICE FOR REPROCESSING WET WASTE MATERIALS CONTAINING ORGANIC COMPONENTS

(71) Applicant: Holcim Technology Ltd, Rapperswil-Jona (CH)

(72) Inventor: Urs Gasser, Rüfenach (CH)

(73) Assignee: HOLCIM TECHNOLOGY LTD., Rapperswil-Jona (CH)

( * ) Notice: Subject to any disclaimer, the term of this patent is extended or adjusted under 35 U.S.C. 154(b) by 351 days.

(21) Appl. No.: 14/269,551

(22) Filed: May 5, 2014

(65) Prior Publication Data

US 2015/0020407 A1 Jan. 22, 2015

Related U.S. Application Data

(62) Division of application No. 14/354,028, filed as application No. PCT/IB2012/002087 on Oct. 18, 2012, now Pat. No. 9,273,904.

(30) Foreign Application Priority Data

Oct. 25, 2011 (AT) .................. A 1566/2011

(51) Int. Cl.
    *F26B 21/06* (2006.01)
    *F26B 23/00* (2006.01)
    (Continued)

(52) U.S. Cl.
    CPC ........... *F26B 23/002* (2013.01); *C04B 7/4407* (2013.01); *C04B 7/4423* (2013.01);
    (Continued)

(58) Field of Classification Search
    CPC ........ F26B 19/00; F26B 21/00; F26B 21/06; F26B 23/00; F27B 9/00; F27B 9/20; F27B 15/00; C04B 7/00; C04B 7/43; C04B 7/47

USPC ....... 34/380, 381, 413, 514; 95/73; 106/740, 106/759; 48/197 R, 197 A, 209; 432/16, 72
    See application file for complete search history.

(56) References Cited

U.S. PATENT DOCUMENTS

| 4,083,676 A | * | 4/1978 | Ritzmann | ................ C04B 7/44 |
|---|---|---|---|---|
| | | | | 106/760 |
| 4,366,000 A | * | 12/1982 | Wadia | ...................... C04B 2/10 |
| | | | | 106/758 |

(Continued)

FOREIGN PATENT DOCUMENTS

| DE | 35 33 775 | * | 3/1987 |
|---|---|---|---|
| DE | 35 33 775 A1 | | 3/1987 |

(Continued)

OTHER PUBLICATIONS

International Search Report dated Mar. 17, 2014, issued in International Application PCT/IB2012/002087.*

(Continued)

*Primary Examiner* — Stephen M Gravini
(74) *Attorney, Agent, or Firm* — Fitch, Even, Tabin & Flannery LLP

(57) ABSTRACT

In a method for reprocessing wet waste materials containing organic components, in particular sludges in a cement clinker production plant, in which raw meal is preheated in a preheater (3) in countercurrent flow to the hot exhaust gases of a clinker furnace (2), and calcined in a calciner (4) fired with alternative fuels, the wet waste materials are dried in a drying unit (18) using a hot gas produced from the preheater waste heat and the dried waste materials and the drier exhaust gases are discharged from the drying unit (18), wherein the drier exhaust gases are introduced into the calciner (4).

19 Claims, 1 Drawing Sheet

(51) Int. Cl.

| | |
|---|---|
| *F23G 5/46* | (2006.01) |
| *F23G 5/04* | (2006.01) |
| *F23G 7/00* | (2006.01) |
| *C04B 7/44* | (2006.01) |
| *F26B 23/02* | (2006.01) |
| *F27B 7/20* | (2006.01) |
| *F27D 17/00* | (2006.01) |
| *F26B 11/02* | (2006.01) |
| *F26B 3/02* | (2006.01) |

(52) U.S. Cl.
CPC ............... *F23G 5/04* (2013.01); *F23G 5/46* (2013.01); *F23G 7/001* (2013.01); *F26B 3/02* (2013.01); *F26B 11/024* (2013.01); *F26B 23/028* (2013.01); *F27B 7/2025* (2013.01); *F27B 7/2033* (2013.01); *F27D 17/004* (2013.01); *F27D 17/008* (2013.01); *F23G 2206/10* (2013.01); *F23G 2206/201* (2013.01); *F23G 2900/50211* (2013.01); *F26B 2200/18* (2013.01); *Y02P 40/126* (2015.11)

(56) References Cited

U.S. PATENT DOCUMENTS

| | | | | | |
|---|---|---|---|---|---|
| 5,134,944 | A | * | 8/1992 | Keller | B09B 3/00 110/229 |
| 5,156,676 | A | * | 10/1992 | Garrett | C04B 7/4438 106/745 |
| 5,423,891 | A | * | 6/1995 | Taylor | C10J 3/06 48/197 A |
| 5,598,641 | A | * | 2/1997 | Kishi | E03D 5/00 110/238 |
| 5,687,674 | A | * | 11/1997 | Johanntgen | F22D 1/36 110/234 |
| 5,809,664 | A | * | 9/1998 | Legros | F26B 3/088 159/4.01 |
| 5,881,475 | A | * | 3/1999 | Kishimoto | C02F 1/048 34/381 |
| 6,006,442 | A | * | 12/1999 | Banerjee | F26B 7/00 34/398 |
| 6,058,623 | A | * | 5/2000 | Brooks | B01D 1/10 34/134 |
| 7,972,419 | B2 | * | 7/2011 | Jepsen | C04B 7/47 106/739 |
| 9,273,904 | B2 | * | 3/2016 | Gasser | F23G 5/04 |
| 2005/0120715 | A1 | * | 6/2005 | Labrador | F01K 27/00 60/618 |
| 2010/0000119 | A1 | * | 1/2010 | Ueno | C04B 7/4446 34/493 |
| 2014/0259732 | A1 | * | 9/2014 | Gasser | F23G 5/04 34/487 |
| 2015/0020407 | A1 | * | 1/2015 | Gasser | F23G 5/04 34/514 |
| 2016/0052822 | A1 | * | 2/2016 | Gasser | C04B 7/43 106/761 |

FOREIGN PATENT DOCUMENTS

| | | | | |
|---|---|---|---|---|
| DE | 35 42 004 | * | 6/1987 | |
| DE | 35 42 004 A1 | | 6/1987 | |
| EP | 0 496 290 | * | 7/1992 | |
| EP | 0 496 290 A2 | | 7/1992 | |
| EP | 2 039 663 | * | 3/2009 | |
| EP | 2 039 663 A1 | | 3/2009 | |
| EP | 2786974 A1 | * | 10/2014 | ............... F23G 5/04 |
| JP | 2002-143829 | * | 5/2002 | |
| JP | 2002-143829 A | | 5/2002 | |
| JP | 2006-035169 A | | 2/2006 | |
| JP | 2006-035189 | * | 2/2006 | |
| WO | WO 2013061127 A2 | * | 5/2013 | ............... F23G 5/04 |

OTHER PUBLICATIONS

International Preliminary Examination Report issued in International Application PCT/IB2012/002087.*

* cited by examiner

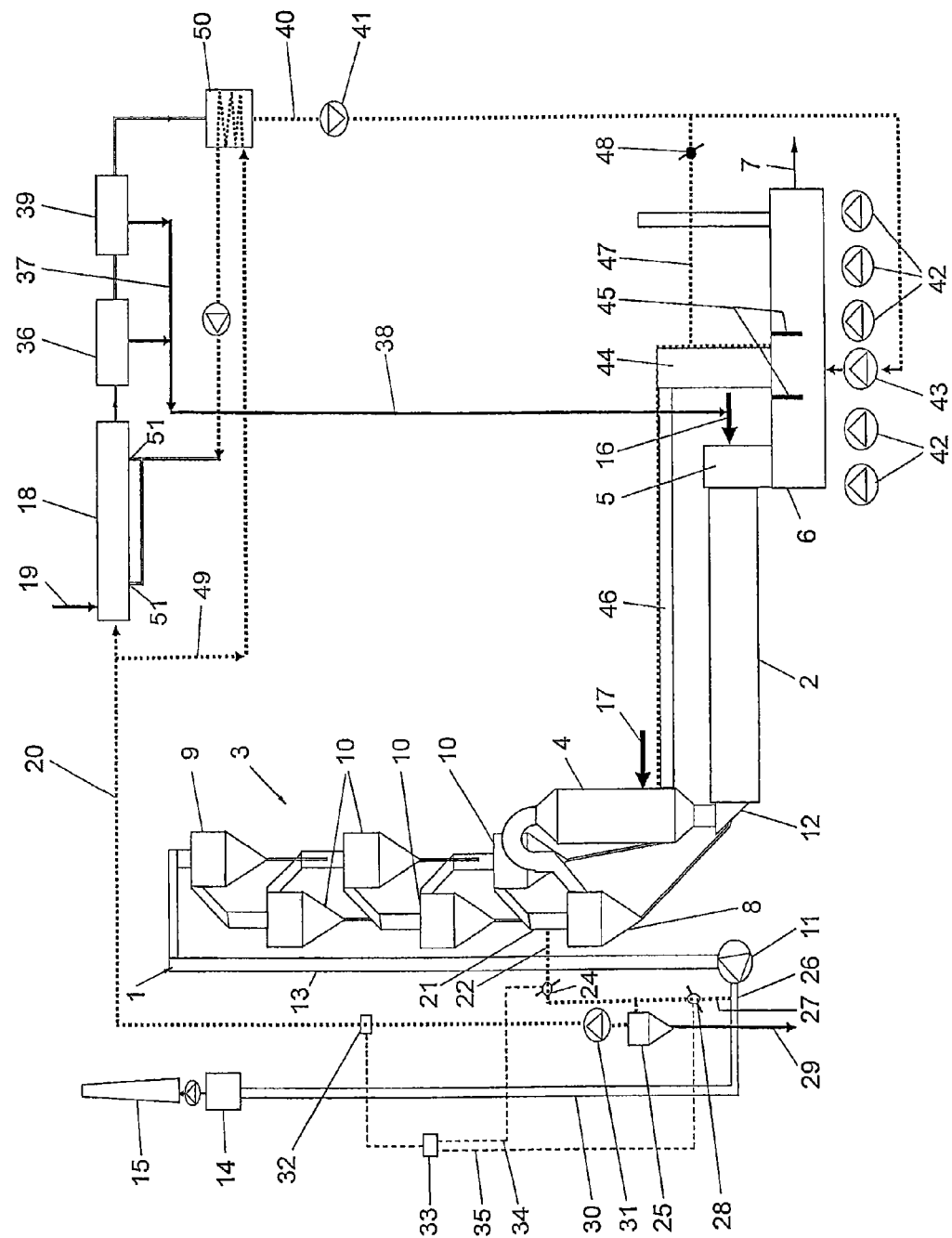

METHOD AND DEVICE FOR REPROCESSING WET WASTE MATERIALS CONTAINING ORGANIC COMPONENTS

CROSS-REFERENCE TO RELATED APPLICATIONS

This is a divisional application of U.S. application Ser. No. 14/354,028, filed on Apr. 24, 2014, which was the U.S. National Stage 371 Application of International Application No. PCT/IB2012/002087, filed Oct. 18, 2012, and claims priority benefit under 35 U.S.C. §119 based on Austrian Patent Application A 1566/2011, filed Oct. 25, 2011, the entire disclosures of which applications are hereby incorporated herein by reference in their entirety for all purposes.

The invention relates to a method for reprocessing wet waste materials containing organic components, in particular sludges in a cement clinker production plant, in which raw meal is preheated in a preheater in countercurrent flow to the hot exhaust gases of a clinker furnace, and calcined in a calciner fired with alternative fuels, wherein the wet waste materials are dried in a drying unit using a hot gas produced from the preheater waste heat and the dried waste materials and the drier exhaust gases are discharged from the drying unit.

The invention further relates to a device for reprocessing wet waste materials containing organic components, in particular sludges in a cement clinker production plant, comprising a clinker furnace with a clinker cooler connected to the outlet end thereof, and with a calciner and a preheater arranged at the inlet end thereof, in which raw meal is preheated and calcined in countercurrent flow to the hot exhaust gases, and a drying unit for the wet waste materials, which is connected to a hot gas line that is supplied with waste heat from the preheater, and is followed by a separator for separating the drier exhaust gases from the dried waste materials.

For the purposes of the present invention, the term waste materials is understood to mean such materials that have a water content of >30%. Wet waste materials that contain organic components originate from refineries or coal mines, for example.

In order to be able to use such waste materials—particularly sludges, which in unfavourable cases may contain a fraction of just 0.1 to 0.3% volatile organic components—as alternative fuels in the cement industry, pretreatment and/or reprocessing including drying and possibly grinding is necessary in order to obtain a high-quality pulverised fuel therefrom that is also easily dispensable, that is to say it is dry. A ball mill with oversized drying chamber and downstream sifter and filter is suitable for this, for example. However, it is associated with the following drawbacks if the intention is to take advantage of energy synergies with a cement clinker production process for the reprocessing process. To ensure that the drying results in sufficient reduction of the water content even when the wet waste materials contain a great deal of water, the temperature of the hot gases used must be high and controllable depending on the water content. For safety reasons, the hot gas must be as inert as possible, and an $O_2$ content lower than 5% is aspired. This means that a simple hot gas generator with air dilution is not suitable.

Consequently, drying is typically carried out using high-quality, expensive fuels such as natural gas or diesel. It would be more economical to use the waste heat from the preheater of the cement clinker production plant for the drying process.

Another problem consists in the fact that the volatile organic components produced during drying have to be removed from the drier exhaust gases for reasons related to environmental safety, odour pollution and so on. For this, it is absolutely essential to arrange an oxidation stage downstream, that is to say thermal purification of the drier exhaust gas, which entails further energy consumption. It is not permitted to use the drier exhaust gases with their high water content as combustion air in the main firing of the clinker furnace because this causes drastic cooling of the main flame and sinter zone. Therefore, simply returning the drier exhaust gases to the clinker furnace via the clinker cooler fan is not a viable solution for removing the volatile organic components.

In the production of cement clinker, raw meal is preheated, fully dehydrated, calcined, combusted to form clinker, and then cooled. Plants that work with this dry process technology consist of a preheater, a calciner, a tertiary air line, a rotary furnace and a clinker cooler. Energy for the conversion of substances in plants of this kind is provided by introducing fuel into the rotary furnace and the calciner. Some of the air that is heated in the clinker cooler is fed to the rotary furnace as secondary air, and some is fed to the calciner as tertiary air. The exhaust gases from the rotary furnace are fed into the calciner through a furnace inlet chamber and a flow constrictor located thereabove—also referred to as the product lock—they pass through the calciner and are routed to the preheater together with the exhaust gases generated in the calciner, the latter consisting of flue gas from the calciner fuel and $CO_2$.

The preheater usually consists of one or more lines, and each line includes several cyclone stages, each of which may be constructed in the form of a gas suspension heat exchanger. The dry cement raw meal is added to the riser of the topmost cyclone stage, passes from top to bottom through the cyclone stages, and is removed from the penultimate (second to bottom) cyclone stage and fed to the calciner. In the calciner, the hot raw meal is almost completely deacidified, and passes together with the calciner exhaust gas into the bottom cyclone stage, where it is separated, forwarded to the furnace inlet chamber, and through this chamber reaches the rotary furnace as hot meal. In the rotary furnace the hot meal is fully dehydrated and combusted to form clinker in the sintering process.

In this context, the objective of the invention is to enable reprocessing of wet waste materials, particularly sludges with a high content of volatile organic components, in the context of a cement clinker production process to obtain an alternative fuel, wherein with regard to reprocessing to the extent possible it should not be necessary to use any additional primary fuel for drying purposes or for purifying the exhaust air. In addition, the invention should be able to function with as few structural adaptations to the existing plant components as possible.

In order to solve this object, according to a first aspect relating to a method of the initially defined kind the invention essentially consists in that the drier exhaust gases are fed into the calciner. Since the drier exhaust gases are fed into the calciner, and preferably substantially only into the calciner, the organic components contained in the drier exhaust gases are thermally exploited without using any additional primary fuel. Since the drier exhaust gases can be at a temperature below 100° C., the introduction thereof into the calciner causes significant cooling inside the calciner, which is generally undesirable. However, the cooling may be prevented simply by raising the quantity of fuel used in the calciner, wherein the additional fuel may consist largely or even entirely of alternative fuels. Thus, a heating circuit that is integrated in the conventional gas flow is created in the cement clinker production plant. The heating circuit consists of the hot gas stream, with which the waste heat from the preheater is made available to the drying unit, the exhaust gas stream of the drying unit, which is introduced into the calciner and the calciner exhaust gas stream, which flows into the preheater. In this context, heat is extracted from the circuit as it flows through the drying unit. But approximately the same amount of heat is returned to the calciner by the additional introduction of alternative fuels in the calciner, so that the total consumption of primary fuel remains the same as for a comparable cement furnace system that does not have any provision for integral waste material reprocessing. This means that the quantity of primary fuel required for conventional sludge drying and oxidation plants is replaced entirely by alternative fuel in the invention. The circulation has the further advantage that an inert atmosphere is assured in the drying unit without great adjustment effort, since the hot gases removed from the preheater always contain less than 5% oxygen.

The FIGURE depicts an embodiment of an embodiment of a present method.

In one of its aspects, a method is provided for reprocessing wet waste materials containing organic components comprised of sludges in a cement clinker production plant. Such a method for reprocessing wet waste materials containing organic components comprised of sludges in a cement clinker production plant comprises preheating raw meal in a preheater and generating preheater waste heat, wherein in the preheating the raw material is introduced and fed through the preheater in a countercurrent to flow to hot exhaust gases from a clinker furnace that are introduced in the preheater, calcining in a calciner fired with alternative fuels, drying the wet waste materials in a drying unit using a hot gas produced from the preheater waste heat, discharging the dried waste materials and the drier exhaust gases from the drying unit, feeding the drier exhaust gases into the calciner, drawing off a partial quantity of the hot gas before the drying unit and cooling the drawn off hot gas in a heat exchanger with the drier exhaust gases, and, forwarding the cooled hot gas to the drying unit as sealing gas.

In order to reduce the expense of constructing the installation for introducing the drier exhaust gases into the calciner, the construction is preferably arranged such that the drying gases are introduced into the calciner together with the tertiary air. Thus, the tertiary air duct is used to introduce the drier exhaust gases, so that a separate feed line into the calciner becomes unnecessary.

In general, it is conceivable to introduce the drier exhaust gases directly into the calciner, that is to say without thermal treatment. But direct introduction via the tertiary air increases the total heat consumption of the plant, since the drier exhaust gases are at relatively low temperatures (150° C. and lower). In this context, improved profitability can be achieved according to a preferred method if the drier exhaust gases are passed through the clinker cooler before they are introduced into the calciner. This raises the temperature of the drier exhaust gases with the aid of the heat from the clinker, and depending on the quantity of the exhaust gas from the drier, preferably to temperatures of at least 300° C. The drier exhaust gases are introduced into the clinker cooler for example via one of the fans that is otherwise used to suck ambient air into the clinker cooler. The drier exhaust gases exit the clinker cooler through the same extraction opening in the cooler lid through which the rest of the tertiary air is also extracted and subsequently fed to the calciner.

A large portion of the ambient air sucked in to the clinker cooler is introduced into the clinker furnace in the form of "secondary air". If the drier exhaust gases constitute a portion of the cooler air, a fraction thereof would also reach the main flame in the rotary furnace as secondary air, and this can have a negative effect on the combustion process. A preferred embodiment therefore provides that the drying exhaust gases are introduced into the clinker cooler at a point in the clinker cooler vertically below the tertiary air extractor. This arrangement helps to ensure that as far as possible the drier exhaust gases only flow vertically through clinker cooler and can be captured mainly by the tertiary gas extractor. If curtain walls are arranged in the clinker cooler upstream and downstream of the point at which the drying gas line opens into the clinker cooler in the direction of movement of the clinker, as is the case in a further preferred embodiment, the danger that some of the drier exhaust gases may get into the secondary air is reduced significantly.

It is essential for drying the wet waste materials that the hot gas is sufficiently hot when it is introduced into the drying unit. It is possible that the waste heat extracted at the end of the preheater may not be sufficient for this. In this context, a preferred embodiment provides that the waste heat is drawn off from the preheater in at least two different locations in the preheater, at two different temperature levels, so that at least two waste heat streams are created and the temperature of the hot gas that is fed into the drying unit can be adjusted by selecting the mixing ratio of the waste heat streams. If two different temperatures levels of waste heat or hot gas are available as a consequence, it then becomes possible to control the temperature simply, and if necessary higher temperatures can be achieved than would be possible using only the hot gas drawn off at the end of the preheater. In order to recover waste heat from the preheater at a higher temperature level, the process is preferably arranged such that the preheater comprises a plurality of preheating stages, and the one waste heat stream is formed from hot gas that is tapped after the last preheater stage, and the other heat stream is formed from hot gas that is tapped at the outlet from an upstream preheater stage, particularly the first preheater stage.

The temperature of the hot gas that is fed to the drying unit is adjustable as described by adjusting the volume flows of the streams of hot gas at different temperature levels and subsequently mixing the two hot gas streams. In this context, the process is designed such that hot gas streams diverted from the preheater are preferably forwarded to a mixing cyclone, and the hot meal separated in the mixing cyclone is returned to the calciner or the raw meal.

In order to ensure that the wet waste materials are dried, it is advantageous if the hot gas supplied to the drying unit is at a temperature of 300-600° C., particularly 500-600° C.

The drying unit used is advantageously in the form of a grinding dryer, so that both drying and grinding can be carried out in a single unit. In this context, it must be ensured that the false air does not get into the grinding dryer, so an inert buffer gas at low temperature is usually used for this purpose. The provision of a buffer gas that is both inert and cool is a problem that can typically only be solved with significant process engineering effort. This effort may be reduced substantially in an embodiment, according to which a partial quantity of the hot gas is drawn off before the drier unit and cooled in a heat exchanger with the drier exhaust gases, and the cooled hot gas is forwarded to the drier unit as sealing gas.

In order to solve the object underlying the invention, according to a second aspect relating to a device of the initially defined kind it is provided that the separator and the calciner are in fluid communication with each other for the purpose of forwarding the drier exhaust gases to the calciner. In this context, the fluid connection may either comprise a direct line between the separator and the calciner or it may pass through existing components and/or installations of the cement clinker production plant. For example, a preferred embodiment provides that a segment of the fluid communication between the separator and the calciner is formed by a tertiary air duct, which links the tertiary air extractor in the clinker cooler with the calciner. It may further be provided that the fluid communication between the separator and the calciner comprises a drying exhaust gas line that opens into the clinker cooler.

In order to prevent the drier exhaust gases that are introduced into the clinker cooler from getting into the clinker furnace as secondary air, it is preferably provided that the drier exhaust gas line opens into the clinker cooler at a point below the tertiary air extractor. A further measure preferably consists in arranging curtain walls in the clinker cooler upstream and downstream of the point at which the drier gas line opens into the clinker cooler in the direction of movement of the clinker.

In the context of recovering or extracting hot gas for the drier unit, it is preferably provided that the preheater comprises at least two tapping points arranged at a distance from one another in the direction of flow for tapping the hot gas via one branch line for each, that control elements, particularly sliders, are provided for adjusting the volume flows of the tapped hot gas, and that the hot gas streams are fed to a mixing device, the outlet opening of which is connected to the hot gas line. It is also advantageous if a temperature sensor is provided for measuring the temperature of the hot gas in the hot gas line, wherein the measured values of the temperature sensor are transmitted to a controller that cooperates with the control elements to set a hot gas temperature from 300-600° C., particularly from 500-600° C. In the case of a preheater, which comprises a plurality of preheater stages, particularly gas suspension heat exchanger connected in series, the one tapping point is preferably after the last preheater stage, and the other tapping point is preferably located at the outlet from an upstream preheater stage, particularly the first preheater stage. The mixing device advantageously consists of a mixing cyclone, from which the solid discharge is connected to the calciner or a raw meal infeed or transportation device for the separated hot meal.

The drier unit is preferably in the form of a grinding dryer, wherein the penetration of false air is prevented by a branch line leading away from the hot gas line to divert a partial flow of the hot gas, wherein the branch line opens into a heat exchanger that can be charged with the drier exhaust gases, so that the branched hot gas can be cooled with the drier exhaust gases, and wherein a line for supplying the cooled hot gas for sealing gas ports of the drier unit is connected to the heat exchanger.

In the following, the invention will be explained in greater detail with reference to a diagrammatic representation of an embodiment thereof in the drawing.

In the drawing, a cement clinker production plant is represented in which raw meal loaded at a point designated diagrammatically with 1 is preheated in a preheater 3 in countercurrent flow to the hot exhaust gases of a clinker furnace 2, and calcined in a calciner 4. The discharge aperture of calciner 4 is connected to the input end of clinker furnace 2. The clinker exits clinker furnace 2 at the point designated with 5 and is cooled in a clinker cooler 6. The cooled clinker exits clinker cooler 6 at the point designated with 7. Preheater 3 may comprise one or more preheater lines. One line is illustrated in the drawing. The line comprises a plurality of gas suspension heat exchangers connected in series, wherein the first gas suspension heat exchanger is designated with 8, the last gas suspension heat exchanger is designated with 9, and the gas suspension heat exchangers arranged therebetween are designated with 10. Furnace fan 11 creates the requisite negative pressure, so that the clinker furnace waste gas exiting on the hot meal input side 12 of clinker furnace 2 is drawn off through calciner 4 and serially connected gas suspension heat exchangers 8, 10 and 9 and hot gas outlet 13. The extracted hot gas exits the clinker production plant after passing though a hot gas purifier 14 via flue 15.

As is shown with reference sign 16, fuel is added for firing the clinker furnace 2. The addition of fuel for firing calciner 4 is illustrated schematically with 17.

For reprocessing sludges, a grinding dryer 18 is provided, to which the sludges are added at location 19. Hot gas is introduced into grinding dryer 18 via hot gas line 20 in order to dry the sludges. Hot gas line 20 is supplied with hot gas tapped from preheater 3. The hot gas is drawn off from preheater 3 at two tapping points. First tapping point 21 is located at the outlet of first gas suspension heat exchanger 8. The branch line provided for drawing off the hot gas from the heat exchanger line is designated with reference number 22. A control element in the form of a slider 24, with which the quantity of hot gas drawn off can be adjusted, is arranged in branch line 22. The hot gas drawn off at tapping point 21 is forwarded to a mixing cyclone 25. A second hot gas stream is drawn off at tapping point 26, which is located after last gas suspension heat exchanger 9 and after furnace fan 11. The corresponding branch line 27 is also equipped with a control element 28 in the form of a slider, with which the quantity of hot gas drawn off at point 26 can also be controlled. The hot gas stream drawn off at tapping point 26 is also forwarded to the mixing cyclone 25. The hot meal precipitated in mixing cyclone 25 is returned to the process via solid discharge 29 at a suitable location, for example via the furnace meal inlet. The hot gas is drawn off from mixing cyclone 25 with the aid of extractor fan 31 and, as described previously, introduced into grinding dryer 18 via hot gas line 20. The quantity of hot gas that is made available for grinding dryer 18 may be adjusted by varying the rotating speed of extractor fan 31.

The temperature of the hot gas passing through hot gas line 20 is measured using temperature sensor 32, wherein the measured values from the temperature sensor are transmitted to a controller 33. Controller 33 is connected to control elements 24 and 28 via control lines 34 and 35, so that the hot gas quantities drawn off at tapping points 21 and 26 can be regulated depending on the temperature desired.

The dried, ground sludge exiting grinding dryer 18 is forwarded to a separator 36 designed as a classifier in which the dried, ground sludge is separated from the dryer waste gas. The dried, ground sludge exits separator 36 at 37 and can either be stored for later use as a fuel or returned immediately to fuel inlet 16 via a line 38 for the main firing of clinker furnace 2. The drier exhaust gas then passes through a filter 39 in which fine fuel fractions are removed from the drier waste gas and also forwarded to the fuel intake. The purified drier exhaust gas then passes through drier exhaust gas line 40, and fan 41 ensures movement of the drier exhaust gas.

Clinker cooler 6 comprises a plurality of fans 42 and 43, wherein drier exhaust gas line 40 is connected to fan 43, so that the drier exhaust gas is forwarded to clinker cooler 6. The drier exhaust gas flows through clinker cooler 6 in a substantially vertical direction and exits clinker cooler 6 via tertiary air extractor 44. In order to prevent the drier exhaust gas that is introduced into clinker cooler 6 from getting into clinker furnace 2 as secondary air, curtain walls 45 are arranged before and after fan 43. The drier exhaust gas that is extracted via tertiary air extractor 44 is fed into tertiary air duct 46 together with a portion of the ambient air that is drawn into clinker cooler 6 through fan 42, and wherein tertiary air duct 46 opens into calciner 4. The drier exhaust gas that is introduced into the calciner 4 in this way is heated further with by firing of the calciner, wherein the calciner firing is conducted mainly using alternative fuels. Thus, the additional heat circuit created by integrating the waste reprocessing method according to the invention in the cement clinker production plant is closed. In this heat circuit, the drier exhaust gas that is introduced into calciner 4 is heated to temperatures from 700-900° C., particularly 850° C., and the hot gas drawn off at tapping point 21 accordingly has a temperature of about 850° C. After passing through preheater 3, the hot gas at tapping point 26 has a temperature from 250 to 350° C., particularly 300° C. The temperature of the hot gas delivered to grinding dryer 18 may be adjusted between 250° C. and 850° C. by selecting the mixing ratio between the hot gas drawn off at tapping point 21 and the hot gas drawn off at tapping point 26. In practice, however, the temperature of the hot gas delivered to grinding dryer 18 is usually limited by the thermal resistance of extractor fan 31, so that maximum temperatures of 550° C. are realistic. The drier exhaust gas drawn off at the outlet of the separator is at a temperature of about 100° C. Since the drier exhaust gas is passed through clinker cooler 6, the temperature of the drier exhaust gas may be raised to values from 300 to 400° C., particularly 350° C., with the result that the additional heat requirement, needed to compensate for the loss of heat in the calciner caused by the introduction of the drier exhaust gases, is minimised, since this additional heat requirement can be supplied easily by increasing the quantity of alternative fuels introduced into calciner 4.

If desired, a partial quantity of the drier exhaust gas may also be added directly to tertiary air duct 46 via a branch line 47, bypassing clinker cooler 6. In this case, control element 48 serves to adjust the quantity of hot gas that is diverted through branch line 47.

The sealing gas required to operate grinding dryer 18 is formed by a partial flow diverted from a hot gas line through line 49. The hot gas diverted through line 49 is forwarded to a heat exchanger 50 in which it is cooled to values below 100° C. with the drier exhaust gas. The cooled hot gas is forwarded to grinding dryer 18 as sealing gas via sealing gas ports 51.

The modifications to the clinker production plant that are required to enable the waste substance reprocessing method according to the invention are limited to the hot gas ports at tapping point 21 and tapping point 26, the arrangement of the tertiary air extraction on the cooler cover and the larger calciner volume. The diameter of the tertiary air line may also have to be enlarged. The waste substance reprocessing method according to the invention is the most economical way to render large quantities of sludges with high contents of organic components and water usable. The only real alternative would be to introduce the sludges into the calciner directly, but this would entail problems with regard to yield fluctuations that are currently completely unpredictable.

The invention claimed is:

1. A method for reprocessing wet waste materials containing organic components comprising sludges in a cement clinker production plant, said method comprising:
preheating raw meal in a preheater and generating preheater waste heat, wherein in said preheating the raw material is introduced and fed through the preheater in a countercurrent to flow to hot exhaust gases from a clinker furnace that are introduced in the preheater, calcining in a calciner fired with alternative fuels, drying the wet waste materials in a drying unit using a hot gas produced from the preheater waste heat, discharging the dried waste materials and the drier exhaust gases from the drying unit, feeding the drier exhaust gases into the calciner, drawing off a partial quantity of the hot gas before the drying unit and cooling the drawn off hot gas in a heat exchanger with the drier exhaust gases, and, forwarding the cooled hot gas to the drying unit as sealing gas.

2. The method according to claim 1, wherein the drier exhaust gases are introduced into the calciner together with the tertiary air.

3. The method according to claim 1, wherein the drier exhaust gases are passed through the clinker cooler before they are introduced into the calciner.

4. The method according to claim 3, wherein the drier exhaust gases are introduced into the clinker cooler at a point of the clinker cooler that is positioned vertically below the tertiary air extractor.

5. The method according to claim 1, wherein the preheater waste heat is drawn off from the preheater in at least two different points of the preheater at two different temperature levels, so that at least two waste heat streams are created and the temperature of the hot gas which is fed to the drying unit is adjusted by selecting the mixing ratio of the waste heat streams.

6. The method according to claim 5, wherein the preheater comprises a plurality of preheater stages and the one waste heat stream is formed from hot gas that is tapped after the last preheater stage, and the other heat stream is formed from hot gas that is tapped at the outlet from an upstream preheater stage, particularly the first preheater stage.

7. The method according to claim 5, wherein the hot gas streams diverted from the preheater are forwarded to a mixing cyclone, and the hot meal separated in the mixing cyclone is returned to the calciner or the raw meal.

8. The method according to claim 1, wherein the hot gas supplied to the drying unit is at a temperature of 300-600° C.

9. The method according to claim 1, wherein the drying unit is in the form of a grinding dryer.

10. A device for reprocessing wet waste materials containing organic components, in particular sludges in a cement clinker production plant, particularly for carrying out the method according to claim 1, comprising a clinker furnace (2) with a clinker cooler (6) that is connected to the outlet end thereof, and with a calciner (4) and a preheater (3) arranged at the inlet end thereof, in which raw meal is preheated and calcined in countercurrent flow to the hot exhaust gases of the clinker furnace (2), and a drying unit (18) for the wet waste materials, which is connected to a hot gas line (20) that is supplied with waste heat from the preheater (3), and is followed by a separator (36) for separating the drier exhaust gases from the dried waste materials, characterised in that the separator (36) and the calciner (4) are in fluid communication with each other for the purpose of forwarding the drier exhaust gases to the calciner (4) and that a branch line (49) leads away from the hot gas line (20) to divert a partial flow of the hot gas, wherein the branch line opens into a heat exchanger (50) that can be charged with the drier exhaust gases, so that the branched hot gas can be cooled with the drier exhaust gases, and wherein a line for supplying the cooled hot gas to sealing gas ports (51) of the drier unit (18) is connected to the heat exchanger (50).

11. The device according to claim 10, wherein a segment of the fluid communication between the separator (36) and the calciner (4) is formed by a tertiary air duct (46), which links the tertiary air extractor (44) in the clinker cooler (6) with the calciner (4).

12. The device according to claim 11, wherein the fluid communication between the separator (36) and the calciner (4) comprises a drier exhaust gas line (40) that opens into the clinker cooler (6).

13. The device according to claim 12, wherein the drier exhaust gas line (40) opens into the clinker cooler (6) at a point below the tertiary air extractor (44).

14. The device according to claim 10, wherein the preheater (3) comprises at least two tapping points (21,26) arranged at a distance from one another in the direction of flow for tapping hot gas via one branch line for each (22, 27), that control elements (24, 28), particularly sliders, are provided for adjusting the volume flows of the tapped hot gas, and that the hot gas streams are fed to a mixing device (25), the outlet opening of which is connected to the hot gas line (20).

15. The device according to claim 14, wherein a temperature sensor (32) is provided for measuring the temperature of the hot gas (20) in the hot gas line, wherein the measured values of the temperature sensor (32) are transmitted to a controller (33) that cooperates with the control elements (24, 28) to set a hot gas temperature from 300-600° C.

16. The device according to claim 14, wherein the preheater (3) comprises a plurality of serially connected preheater stages (8, 9, 10), particularly gas suspension heat exchangers, and the one tapping point (26) is arranged after the last preheater stage (9) and the other tapping point (21) is arranged at the outlet from an upstream preheater stage, particularly the first preheater stage (8).

17. The device according to claim 14, wherein the mixing device (25) is in the form of a mixing cyclone, from which the solid discharge (29) is connected to the calciner (4) or a raw meal infeed or transportation device (12) for the separated hot meal.

18. The device according to claim 10, wherein the drier unit (18) is in the form of a grinding dryer.

19. The device according to claim 10, wherein curtain walls (45) are arranged in the clinker cooler (6) upstream and downstream of the point at which the drying gas line (40) opens into the clinker cooler (6) in the direction of movement of the clinker.

* * * * *